US006534889B2

United States Patent
Katagiri et al.

(10) Patent No.: US 6,534,889 B2
(45) Date of Patent: Mar. 18, 2003

(54) MOTOR WITH ROTATOR HAVING SHAFT INSERTION SECTIONS WITH DIFFERENT INTERNAL PERIPHERAL SURFACES

(75) Inventors: Masayuki Katagiri, Nagano (JP); Hiromitsu Takei, Nagano (JP); Makoto Akabane, Nagano (JP)

(73) Assignee: Sankyo Seiki Mfg. Co., Ltd., Nagano-ken (JP)

( * ) Notice: Subject to any disclaimer, the term of this patent is extended or adjusted under 35 U.S.C. 154(b) by 0 days.

(21) Appl. No.: 09/730,902

(22) Filed: Dec. 6, 2000

(65) Prior Publication Data

US 2001/0038250 A1 Nov. 8, 2001

(30) Foreign Application Priority Data

Dec. 17, 1999 (JP) ............................. 11-358963

(51) Int. Cl.[7] ..................... H02K 5/00; H02K 11/00; H02K 7/00
(52) U.S. Cl. ...................... 310/91; 310/67 R
(58) Field of Search ................. 310/67 R, 66, 310/40 R, 10, 91

(56) References Cited

U.S. PATENT DOCUMENTS

| | | | | |
|---|---|---|---|---|
| 5,343,104 A | * | 8/1994 | Takahashi et al. | 310/67 R |
| 5,357,163 A | * | 10/1994 | Minakuchi et al. | 310/156.06 |
| 5,436,519 A | * | 7/1995 | Takahashi et al. | 310/217 |
| 5,723,927 A | * | 3/1998 | Teshima | 310/67 R |
| 5,724,213 A | * | 3/1998 | Kim | 360/271.3 |
| 5,861,700 A | * | 1/1999 | Kim | 310/216 |
| 6,095,758 A | * | 8/2000 | Chou | 417/63 |
| 6,097,121 A | * | 8/2000 | Oku | 310/258 |
| 6,138,320 A | * | 10/2000 | Komo | 15/250.3 |
| 6,163,093 A | * | 12/2000 | Shimizu et al. | 310/42 |
| 6,222,286 B1 | * | 4/2001 | Watanabe et al. | 310/257 |
| 6,307,291 B1 | * | 10/2001 | Iwaki et al. | 310/90 |
| 6,339,273 B1 | * | 1/2002 | Higuchi | 310/67 R |
| 6,341,426 B1 | * | 1/2002 | Okumura | 33/1 PT |

FOREIGN PATENT DOCUMENTS

| | | | | |
|---|---|---|---|---|
| JP | 05248396 A | * | 9/1993 | F04D/29/32 |
| JP | 08023656 A | * | 1/1996 | F16C/33/10 |

* cited by examiner

*Primary Examiner*—Nestor Ramirez
*Assistant Examiner*—Pedro J. Cuevas
(74) *Attorney, Agent, or Firm*—Hogan & Hartson, LLP

(57) ABSTRACT

A motor has a rotatably supported rotor shaft and a rotator that rotates together with the rotor shaft. The rotator includes a shaft insertion section that has an internal peripheral surface and a specified length in an axial direction in which the rotor shaft is inserted. The internal peripheral surface has a first internal peripheral surface of a small diameter and a second internal peripheral surface having a diameter slightly greater than that of the first internal peripheral surface. The first internal peripheral surface engages the rotor shaft under a pressure, and the second internal peripheral surface is slightly spaced a distance from the rotor shaft, such that a gap is created between the second internal peripheral surface and the rotor shaft. The rotor shaft is pressure-inserted in the first internal peripheral surface to be affixed to the rotator, and an adhesive is filled in the gap between the second internal peripheral surface and the rotor shaft to affix the second internal surface to the rotator.

22 Claims, 3 Drawing Sheets

GRAPH 1: RELATION BETWEEN PRESSURE-INSERTION LENGTH AND PULLING-OUT STRENGTH

MOTOR WITH ROTATOR HAVING SHAFT INSERTION SECTIONS WITH DIFFERENT INTERNAL PERIPHERAL SURFACES

BACKGROUND OF THE INVENTION

1. Field of the Invention

The present invention generally relates to a motor, and more particularly to a motor that rotatably drives discs, such as, for example, a CD-ROM, a DVD-ROM and the like. The present invention also relates to a method for manufacturing a motor for rotatably driving discs.

2. Description of Related Art

In conventional motors, when a rotator such as a turntable is affixed to a rotor shaft, the rotor shaft is engaged with the turntable by a running fit method. In the running fit method, an adhesive is filled in a gap between the rotor shaft and a central bore of the turntable to thereby affix the turntable to the rotor shaft. More specifically, when the turntable is affixed to the rotor shaft, the adhesive is coated on an internal surface of the bore of the turntable, and the rotor shaft is inserted in the bore of the turntable. However, in the structure that uses a running fit, the turntable needs to be fixed at a specified portion with respect to the rotor shaft until the adhesive hardens. As a result, the production efficiency is lowered and the plane oscillation characteristic becomes unstable.

Also, since the turntable coated with the adhesive is inserted over the rotor shaft, the adhesive may adhere to areas of the rotor shaft where bonding by the adhesive is not required. In the case of a spindle motor for CDs, a core adjusting ring is spring-loaded about the rotor shaft and moves along the rotor shaft with respect to the turntable. In order to secure the movement of the core adjusting ring, the adhesive adhered to the rotor shaft must be completely removed from the rotor shaft. Accordingly, the work efficiency is lowered due to the cleaning work that is required to remove the adhesive from the rotor.

Moreover, the adhesive that is coated on the internal surface of the bore of the turntable is scraped off by the rotor shaft when the rotor shaft is inserted in the bore of the turntable. As a result, only a small amount of the adhesive remains in the gap between the bore of the turntable and the rotor shaft, and therefore problems occur in that a sufficient bonding strength cannot be obtained. Also, variations would likely occur in the bonding strength.

Moreover, if the turntable is affixed to the rotor shaft by a pressure-insertion to obtain a sufficient bonding strength, and the pressure is excessive, the thrust bearing provided under the rotor shaft may deform. This results in problems, such as, deterioration of the motor characteristics.

SUMMARY OF THE INVENTION

The present invention has been made to solve the problems of the prior art described above. It is an object of the present invention to provide a motor having an engaging section between a rotor shaft and a rotator with a step-like structure, which allows the rotator and the rotor shaft to be securely affixed to each other by a pressure-insertion and an adhesive.

In accordance with an embodiment of the present invention, a motor has a rotatably supported rotor shaft and a rotator that rotates together with the rotor shaft in a unit. The rotator includes a shaft insertion section that has an internal peripheral surface and a specified length in an axial direction in which the rotor shaft is inserted. In one aspect of the embodiment of the present invention, the internal peripheral surface has a first internal peripheral surface of a small diameter and a second internal peripheral surface having a diameter slightly greater than that of the first internal peripheral surface. In another aspect of the embodiment of the present invention, the first internal peripheral surface engages the rotor shaft, and the second internal peripheral surface is slightly spaced a distance from the rotor shaft, such that a gap is created between the second internal peripheral surface and the rotor shaft. In another aspect of the embodiment of the present invention, the rotor shaft is pressure-inserted in the first internal peripheral surface to be affixed to the rotator, and an adhesive is filled in the gap between the second internal peripheral surface and the rotor shaft to affix the second internal surface to the rotator.

As a result, the rotator is maintained at a fixed position with respect to the rotor shaft after the rotator is inserted over the rotor shaft until succeeding steps without an extra tool to support and retain the rotor shaft with respect to the rotator. Also, if the rotator is temporarily affixed to the rotor shaft, the position of the rotator can be readjusted after the rotator is pressure-inserted over the rotor shaft. Also, an adhesive can be coated after the rotator is inserted over the rotor shaft. As a result, the adhesive is not scraped off when the rotator is pressure-inserted over the rotor shaft, the adhesive does not stain the rotor shaft, and variations in the adhesive coat do not occur.

In accordance with another embodiment of the present invention, a lid member may be pressure-inserted over the rotor shaft on an opposite side of the first internal peripheral surface with the second internal peripheral surface being interposed between the first internal peripheral surface and the lid. As a result, the gap is covered by the lid member. Also, the lid member can help maintaining a high bonding strength for a longer period when an anaerobic adhesive is used.

In accordance with another embodiment of the present invention, the rotator may be a turntable on which a disc is mounted, the insertion section may be formed on the turntable. As a result, the turntable for driving a disc can be affixed to the rotor shaft with a sufficient bonding strength.

Moreover, in accordance with another embodiment of the present invention, the rotor shaft is pressure-inserted in the rotator under a relatively light pressure. The rotator does not move with respect to the rotor shaft after the rotor shaft is pressure-inserted in the rotator until a succeeding step, such that the rotator and the rotor shaft are temporarily, readily connected to each other, and the position of the rotator can be readjusted after the rotator is pressure-inserted over the rotor shaft.

Furthermore, in accordance with another embodiment of the present invention, the rotator is not limited to a turntable, but also includes a rotor case.

In accordance with an embodiment of the present invention, a method for manufacturing a motor comprises the steps of providing a rotator with a stepped shaft insertion section that has a first bore of a first diameter smaller than a diameter of the rotor shaft and a second bore having a second diameter greater than the first diameter of the first bore such that a gap is created between the second bore and the rotor shaft. The rotor shaft is pressure-inserted in the first bore, and then, an adhesive is filled in the gap between the second bore and the rotor shaft. As a result, the adhesive does not stain the rotor shaft, and variations in the adhesive coat do not occur. The method of the embodiment of the present invention substantially improves the production efficiency.

Other features and advantages of the invention will be apparent from the following detailed description, taken in conjunction with the accompanying drawings that illustrate, by way of example, various features of embodiments of the invention.

DESCRIPTION OF PREFERRED EMBODIMENTS

Figure 1:
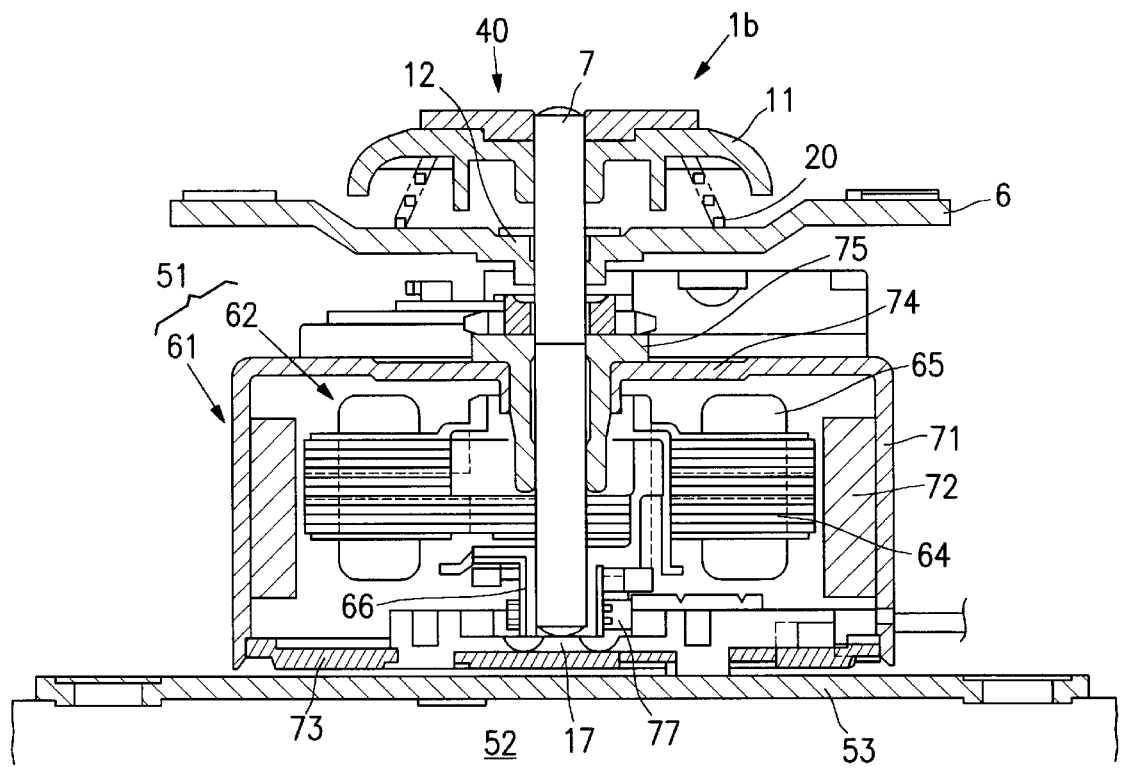
FIG. 1 shows a cross section of a motor in accordance with an embodiment of the present invention.
Figure 2:
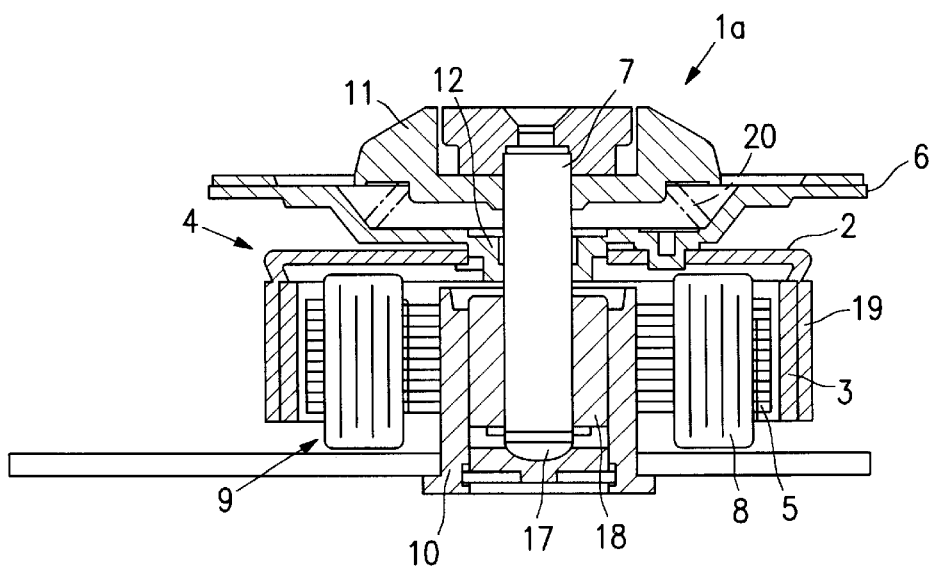
FIG. 2 shows a cross section of a motor in accordance with another embodiment of the present invention.

A motor in accordance with an embodiment of the present invention is described below with reference to the accompanying drawings. The motor of the present embodiment may be a brush-less motor or a motor with brushes. The motor may be mounted in a driving apparatus, such as, for example, a CD-ROM drive, DVD-ROM drive, and the like. FIG. 1 shows an example of a motor with brushes 1b, and FIG. 2 shows an example of a brush-less motor 1a.

The motor with brushes shown in FIG. 1 includes a spindle motor 51 that rotatably drives a variety of discs, such as, for example, CDs, CD-ROMs, DVD-ROMs, and DVD-RAMS. The spindle motor 51 is attached to a chassis 52 of the driving apparatus by means of a mounting plate 53.

The spindle motor 51 of the present embodiment includes a stator assembly 61 having driving magnets 72 and a rotor assembly 62 that forms an armature. The stator assembly 61 includes a motor case 71 that is formed from a cylindrical member with a bottom. Driving magnets 72 arranged in a ring shape are mounted on the internal surface of the cylindrical member of the motor case 71. A case side plate 73 having a generally circular disc shape is affixed to an open end section of the motor case 71 (i.e., a lower end section of the motor case 71 shown in FIG. 1) by an appropriate means such as caulking or the like. The motor case 71 has a bottom wall plate 74 that forms a closed end side of the motor case 71 (i.e., an upper end section of the motor case 71 shown in FIG. 1). A radial bearing 75 is mounted on the bottom wall plate 74. The radial bearing 75 rotatably supports a rotor shaft 7 of the rotor assembly 62.

Rotor cores 64 may be formed from stacked steel plates, and are affixed to the rotor shaft 7. A driving coil 65 is wound around a salient-pole section of each of the rotor cores 64. The outermost peripheral surface of the salient-pole section of each of the rotor cores 64 is disposed in the proximity of and opposing to the driving magnets 72.

A thrust bearing 17 is provided generally in a central area of the case side plate 73. An end section of the rotor shaft 7 is rotatably supported in the axial direction by the thrust bearing 17. A pair of brushes 77 is provided on the case side plate 73 to supply driving current to the driving coils 64. A commutator 66 that contacts the brushes 77 is mounted on the rotor shaft 7.

An output section of the rotor shaft 7 upwardly protrudes by a specified length from the bottom wall plate 74 that forms the closed end side of the motor case 71, as shown in FIG. 1. A turntable device 40 for mounting and driving a disc of various types is attached to an external end section of the output section of the rotor shaft 7. The turntable device 40 includes a turntable 6 that is affixed to the rotor shaft 7, a core adjusting ring 11 provided above the turntable 6 about the rotor shaft 7 in a manner movable along the rotor shaft 7, a spring 20 provided on the turntable 6 to resiliently push up the core adjusting ring 11, and a stopper (not shown) that regulates the ascending position of the core adjusting ring 11.

Next, a brush-less motor 1a in accordance with an embodiment of the present invention is described below with reference to FIG. 2. As shown in FIG. 2, the brush-less motor 1a has a rotor 4, a stator 9 and a retaining member 10. The rotor 4 has a rotor shaft 7, a rotor case 2 attached to the rotor shaft 7, and rotor magnets 3 attached to the rotor case 2. The stator 9 includes stator cores 5 disposed opposite to the rotor magnets 3 and stator coils 8 wound around the stator cores 5. The retaining member 10 has a bearing assembly that retains the stator 9.

An external peripheral surface of the rotor case 2 is formed with a cylindrical section 19. The rotor magnets 3 in a cylindrical configuration are attached to the internal surface of the cylindrical section 19. The rotor magnets 3 form a part of the rotor 4. A rotor sleeve 18 rotatably supports the rotor shaft 7. As the rotor shaft 7 rotates, the rotor magnets 3 also rotate together with the rotor case 2. Internal surfaces of the rotor magnets 3 are disposed opposite to external surfaces of the stator cores 5, and separated by an appropriate gap from the external surfaces of the stator cores 5. The stator cores 5 may be formed from a plurality of stacked core plates, and include a plurality of salient-poles extending in a radial direction. A stator coil 8 is wound around each of the salient-poles of the stator cores 5.

A turntable 6 that defines a rotator is rotatably mounted on an upper side of the rotor case 2 in a manner that the turntable 6 rotates with the rotor case 2 as a unit. A core adjusting ring 11 is provided above the turntable 6 in a manner movable along the rotor shaft 7 by means of a spring 20. The core adjusting ring 11 determines the central position of a disc that is mounted on the turntable 6.

The rotor 4 is rotated by magnetic attraction and repelling forces between the rotor magnets 3 and the salient-poles of the stator cores 5, which are generated by the switching control of electrical conduction to the stator coils 8 depending on rotational positions of the magnetic poles of the rotor magnets 3. As a result, a disc mounted on the turntable 6 that turns together with the rotor 4 is continuously rotated. The disc contains data, and the data is reproduced as the motor rotates.

Figure 3:
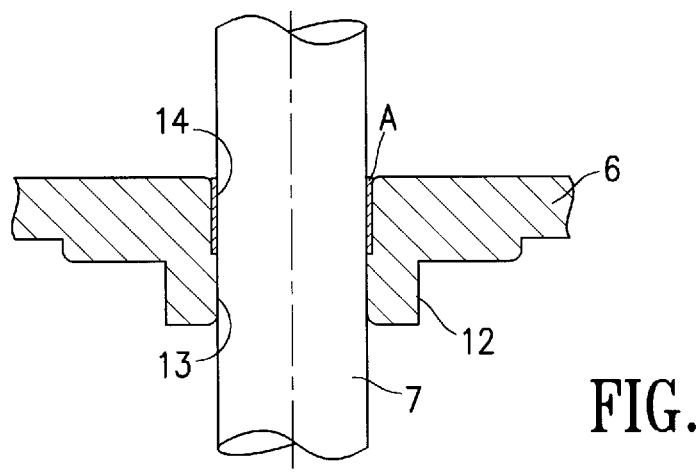
FIG. 3 shows a cross section of one example of a shaft insertion section of a rotator in that can be used in the motor shown in FIG. 1 or FIG. 2.

In each of the motors shown in FIGS. 1 and 2, to secure the movement of the core adjusting ring 11 and to provide a sufficient bonding strength between the turntable 6 and the rotor shaft 7, the turntable 6 and the rotor shaft 7 has an affixing structure that prevents adhesive from adhering to the rotor shaft 7. The affixing structure to connect the turntable 6 to the rotor shaft 7 may be commonly applicable to both of the motors shown in FIGS. 1 and 2. FIG. 3 schematically shows a cross section in part of the affixing structure that connects the turntable 6 to the rotor shaft 7 of each of the motors shown in FIGS. 1 and 2.

A shaft insertion section 12 is formed in the turntable 6. The shaft insertion section 12 protrudes from the turntable 6 in an axial direction in which the rotor shaft 7 is inserted in the turntable 6 and has a specified length extending in the axial direction. The shaft insertion section 12 defines a cylindrical bore extending in the axial direction of the rotor shaft 7. An internal surface of the cylindrical bore of the shaft insertion section 12 is formed from a first internal peripheral surface 13 that defines a pressure-insertion section and a second internal peripheral surface 14 that defines an adhesive bonding section. The first internal peripheral surface 13 has a specified length extending in the axial direction and a diameter that is slightly smaller than a diameter of the rotor shaft 7. The second internal peripheral surface 14 has a specified length extending in the axial direction and a diameter slightly greater than the internal diameter of the first internal peripheral surface 13, such that a gap is created between the second internal peripheral surface 14 and the rotor shaft 7. Accordingly, a step is created between the first internal peripheral surface 13 and the second internal peripheral surface 14. The first internal peripheral surface 13 of the turntable 6 is pressure-inserted over the rotor shaft 7, and an adhesive A is filled in the gap between the second internal peripheral surface 14 and the rotor shaft 7 to thereby connect the turntable 6 to the rotor shaft 7. The lengths of the first internal peripheral surface 13 and the second internal peripheral surface 14 in their axial direction are determined by required bonding strengths achieved by the pressure-insertion and the adhesive. The first internal peripheral surface 13 may have an internal diameter such that the first internal peripheral surface 13 can be pressure-inserted with a relatively light pressure. The second internal peripheral surface 14 may have an internal diameter that is slightly greater than the external diameter of the rotor shaft 7. Accordingly, the adhesive A can be filled in the gap between the second internal peripheral surface 14 and the rotor shaft 7 after the first internal peripheral surface 13 is pressure-inserted over the rotor shaft 7. For example, the internal diameter of the second internal peripheral surface 14 is 0.01–0.02 mm greater than the external diameter of the rotor shaft 7.

In accordance with the embodiment of the present invention described above, the shaft insertion section 12 of the turntable 6 is provided with the first internal peripheral surface 13 that is a smaller diameter section which allows a relatively light pressure-insertion. As a result, when the turntable 6 is affixed to the rotor shaft 7 in an assembly process, the turntable 6 does not move with respect to the rotor shaft 7 until a succeeding step in the assembly process, and can be temporarily affixed to the rotor shaft 7. Moreover, the position of the turntable 6 can be readjusted with respect to the rotor shaft 7 after the pressure-insertion is conducted. In other words, the internal diameter of the first internal peripheral surface 13 may be set to accommodate the readjustment of the position of the turntable 6.

Also, after the turntable 6 is pressure-inserted over the rotor shaft 7, the adhesive A is coated on the second internal peripheral surface 14. As a result, the adhesive A is not scraped off when the turntable 6 is pressure-inserted over the rotor shaft 7, and the rotor shaft 7 is not stained with the adhesive A. Also, the adhesive A is evenly coated on the second internal peripheral surface 14 without variations in its thickness, and the adhesive A can be coated only in a required amount, such that a stable pulling-out force (i.e., bonding strength) between the turntable 6 and the rotor shaft 7 is obtained.

Moreover, even when bearing oil flows from the motor main body, the pressure-insertion section and the adhesive bonding section can stop the bearing oil from flowing into the side of the turntable 6.

Also, even though the length of the pressure insertion section of the shaft insertion section 12, in other words, the length of the first internal peripheral surface 13 is made relatively short, the turntable 6 can secure a sufficient retaining force with respect to the rotor shaft 7 because the second internal peripheral surface 14 is provided to allow the use of the adhesive. By shortening the length of the first internal peripheral surface 13, the size of to the motor can be reduced.

Figure 4:
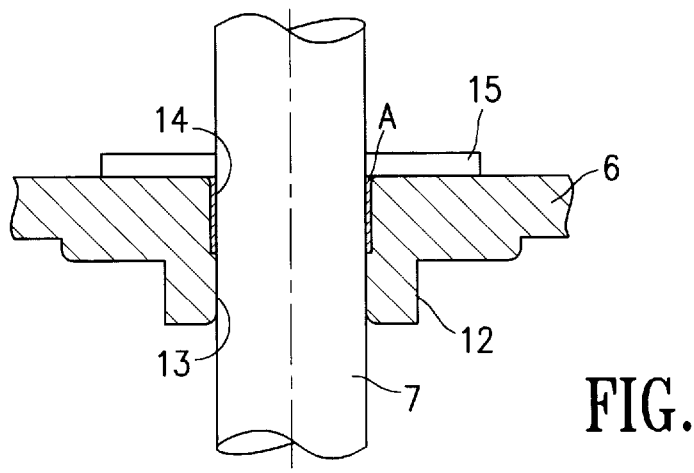
FIG. 4 shows a cross section of one example of a shaft insertion section of a rotator in that can be used in the motor shown in FIG. 1 or FIG. 2.

Also, as shown in FIG. 4, a lid member such as a washer 15 can be affixed about the rotor shaft 7 on the opposite side of the first internal peripheral surface 13 with the second internal peripheral surface 14 being interposed between the washer 15 and the first internal peripheral surface 13. The washer 15 may be attached to the turntable 6 by any appropriate means. For example, the washer 15 is provided with an aperture through which the rotor shaft 7 is passed. The aperture of the washer 15 has a diameter slightly smaller than an external diameter of the rotor shaft 7, such that the washer 15 can be pressure-inserted over the rotor shaft 7. When the washer 15 is pressure-inserted about the rotor shaft 7, the washer 15 seals the adhesive A that fills in the gap between the rotor shaft 7 and the second internal peripheral surface 14. The washer 15 improves the retaining force of the adhesive. When an anaerobic adhesive is used, the washer 14 can maintain a high bonding strength of the anaerobic adhesive for a long period. Also, the washer 15 prevents the adhesive from flowing out along the axial direction into an upper side of the rotor shaft 7.

Figure 5:
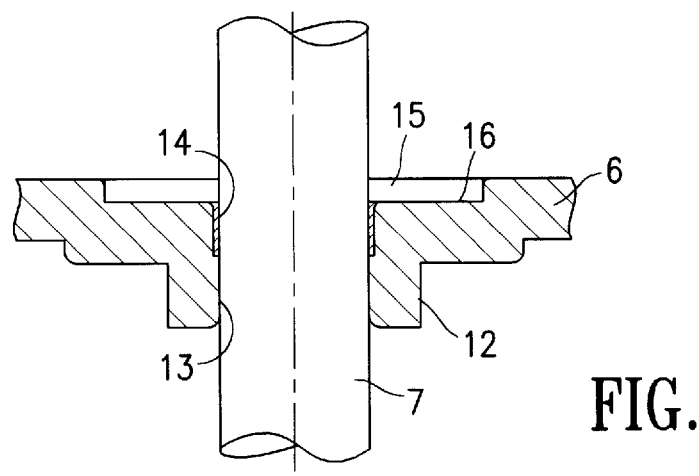
FIG. 5 shows a cross section of one example of a shaft insertion section of a rotator in that can be used in the motor shown in FIG. 1 or FIG. 2.

In one embodiment, as shown in FIG. 5, a recessed section 16 that continues with the second internal peripheral surface 14 may be provided on the upper surface of the turntable 6 to receive the washer 15. The recessed section 16 may be provided with a depth greater than the thickness of the washer 15, and more preferably a depth that is the same as the thickness of the washer 15. The recessed section 16 allows the washer 15 to more closely contact to the turntable 6 and to more thoroughly cover the second internal peripheral surface 14 that defines the adhesive bonding section. As a result, a sufficient affixing strength is secured between the rotor shaft 7 and the turntable 6.

The thrust bearing 17 that rotatably supports the rotor shaft 7 can be formed by a molding method. Even when the thrust bearing 17 is formed from a molded member, and receives a load that is generated when the turntable 6 is inserted over the rotor shaft 7, the thrust bearing 17 does not deform because the turntable 6 can be pressure-inserted over the rotor shaft 7 with a relatively light pressure.

Figure 6:
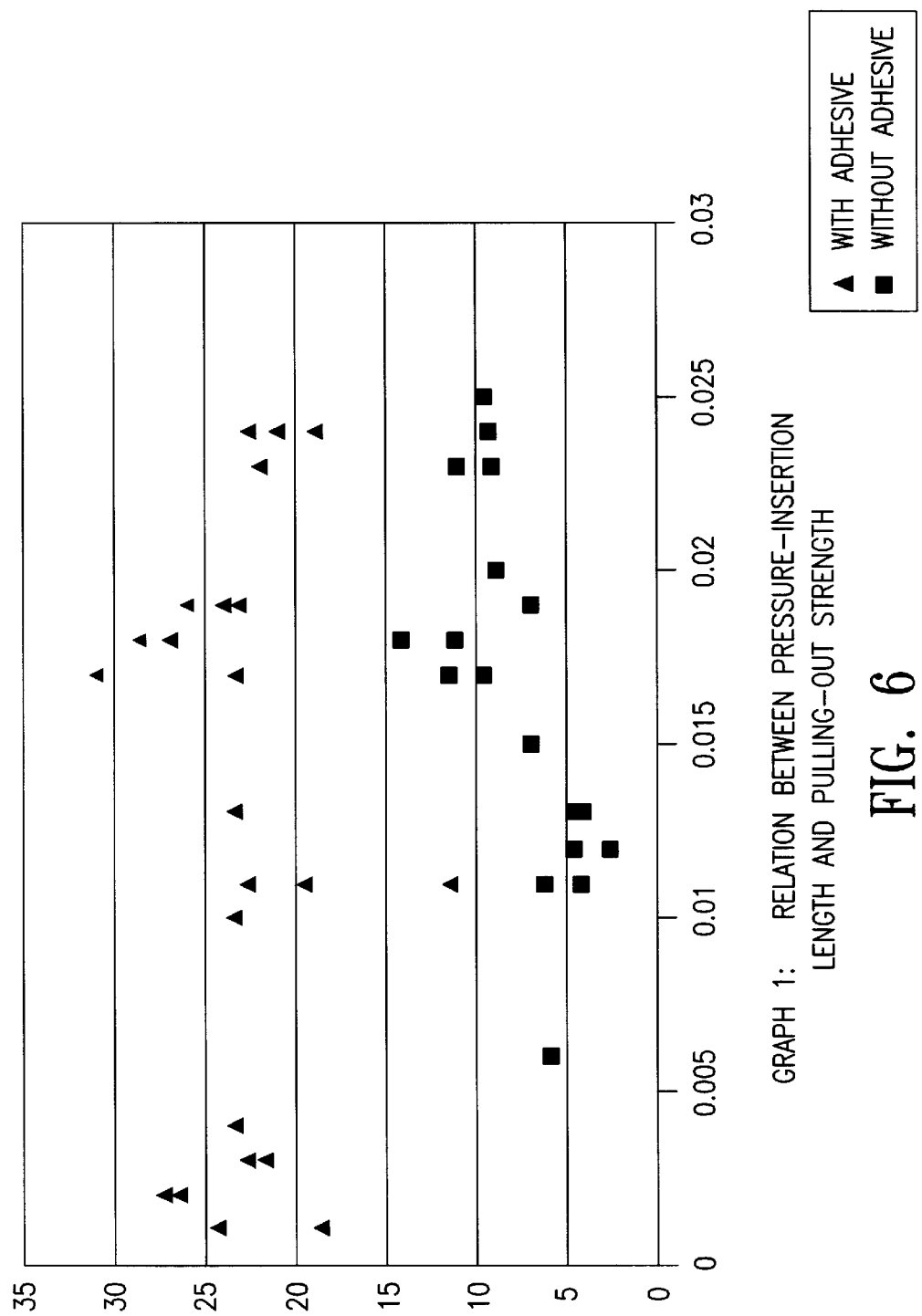
FIG. 6 is a graph showing the relation between pressure-insertion lengths of rotators with respect to rotor shafts and pulling-out strengths.

FIG. 6 is a graph showing the relation between pressure-insertion lengths and the pulling-out strengths. Square dots in the graph indicate results obtained when a rotator is affixed to a rotor shaft only by a pressure-insertion without using an adhesive, and triangle dots indicate results obtained when a rotator is affixed to a rotor shaft by a pressure-insertion and an adhesive.

When the rotator and the rotor shaft are connected only by the pressure-insertion, the pulling-out strengths are about 5–15 kgf for any pressure-insertion lengths ranging from 0.005 mm–0.025 mm. On the other hand, when the rotator and the rotor shaft are connected by the pressure-insertion and the adhesive, the pulling-out strengths are about 20–30 kgf for the same range of pressure-insertion lengths (i.e., from 0.005 mm–0.025 mm). It is understood that the pulling-out strengths obtained by the pressure-insertion and adhesive are always greater that those obtained only by the pressure-insertion. It is clear that the bonding with the adhesive improves the bonding strength between the rotor shaft and the rotator. As shown in FIG. 6, even when the pressure-insertion length is close to zero (0) mm, a sufficient pulling-out strength is secured.

It is noted that the embodiments are described above with reference to examples in which the rotator is a turntable. However, the rotator can also be another type of rotator, such as, for example, a rotor case with rotor magnets attached thereto. An affixing structure between the rotor case and the rotor shaft may be provided with a stepped structure in the same manner described above, and the rotor case and the rotor shaft may be connected by the pressure-insertion and adhesive. Such an affixing structure provides the same effects as those obtained by the embodiments described above.

In accordance with an embodiment of the present invention, a motor has a rotor shaft and a rotator that rotates together with the rotor shaft in a unit. The rotator includes a shaft insertion section that has an internal cylindrical surface and a specified length extending in an axial direction in which the rotor shaft is inserted. The internal cylindrical surface has a first internal cylindrical surface having a small diameter and a second internal cylindrical surface having a diameter slightly greater than that of the first internal cylindrical surface. The first internal cylindrical surface engages the rotor shaft under a pressure, and the second internal cylindrical surface is slightly spaced a distance from the rotor shaft, such that a gap is created between the second internal cylindrical surface and the rotor shaft. The rotor shaft is pressure-inserted in the first internal cylindrical surface such that the rotor shaft is affixed to the rotator, and an adhesive is filled in the gap between the second internal cylindrical surface and the rotor shaft to affix the second internal cylindrical surface to the rotator. As a result, the rotator is maintained at a fixed position with respect to the rotor shaft after the rotator is inserted over the rotor shaft through succeeding steps. Also, the rotator can be temporarily connected to the rotor shaft, and an adhesive can be coated after the rotator is pressure-inserted over the rotor shaft. As a result, the adhesive is not scraped off when the rotator is pressure-inserted over the rotor shaft, and the adhesive can be coated only in a required amount, such that a stable pulling-out strength between the rotator and the rotor shaft is secured.

Alternatively, the rotor shaft may be reduced in diameter to provide a smaller diameter section and a larger diameter section such that a step is created between the smaller diameter section and the larger diameter section. The rotator includes a shaft insertion section with a cylindrical bore having a generally uniform diameter that engages the larger diameter section of the rotor shaft under pressure. In other words, the larger diameter section of the rotor shaft has an outer diameter slightly greater than an internal diameter of the cylindrical bore, such that the larger diameter section of the rotor shaft can be pressure-inserted in the cylindrical bore of the rotator under a relatively light pressure. The smaller diameter section of the rotor shaft has a diameter slightly smaller than the internal diameter of the cylindrical bore of the rotator such that a gap is created between the smaller diameter section of the rotor shaft and the cylindrical bore of the rotator. The larger diameter section of the rotor shaft is inserted in the cylindrical bore until the step in the rotor shaft is disposed inside the cylindrical bore of the rotator. An adhesive is filled in the gap between the smaller diameter section of the rotor shaft and the cylindrical bore of the rotator.

In accordance with another embodiment of the present invention, a lid member is provided on the rotator to cover the gap between the second internal cylindrical surface and the rotor shaft. The lid member is provided with an aperture through which the rotor shaft is passed. The aperture of the lid member has a diameter slightly smaller than an external diameter of the rotor shaft, such that the lid member can be pressure-inserted over the rotor shaft on an opposite side of the first internal cylindrical surface with the second internal cylindrical surface being interposed between the first internal cylindrical surface and the lid member. As a result, the adhesive-bonding section is covered by the lid member. The lid member is highly effective in maintaining a high bonding strength for a longer period when an anaerobic adhesive is filled in the gap.

In accordance with another embodiment of the present invention, the rotator may compose a turntable on which a disc is mounted. By the application of the affixing structure of the present invention to the turntable, the turntable can be affixed to the rotor shaft with a sufficient bonding strength. When a core adjusting ring is slidably mounted about the rotor shaft, the affixing structure of the present invention does not adversely affect the slidable movement of the core adjusting ring. Also, the present invention can also be applied to a rotor case with rotor magnets attached thereto. As a result, the rotor case can be affixed to the rotor shaft with a sufficient affixing strength.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising a rotor shaft and a rotator that rotates together with the rotor shaft, wherein the rotator comprises:

a shaft insertion section having a specified length in an axial direction in which the rotor shaft is inserted, the shaft insertion section having an internal peripheral surface, the internal peripheral surface having a first internal peripheral surface of a first diameter and a specified length in the axial direction, and a second internal peripheral surface having a second diameter slightly greater than the first diameter of the first internal peripheral surface such that a gap is created between the second internal peripheral surface and the rotor shaft and having a specified length in the axial direction, and wherein the rotor shaft is pressure-inserted in the first internal peripheral surface to be affixed to the rotator, and an adhesive is filled in the gap between the second internal peripheral surface and the rotor shaft to affix the second internal surface to the rotator, wherein the adhesive is not present between the rotor shaft and the first internal peripheral surface of the shaft insertion section.

2. A motor according to claim 1, wherein a lid member is pressure-inserted over the rotor shaft on an opposite side of the first internal peripheral surface with the second internal peripheral surface being interposed therebetween to thereby close the gap by the lid member.

3. A motor according to claim 2, wherein the rotator is a turntable on which a disc is mounted, the insertion section includes a protruded section protruding in the axial direction in a central area of the turntable, and the turntable has a recessed section for receiving the lid member in the central area, the recessed section being continuous with the second internal peripheral surface.

4. A motor according to claim 3, further comprising a thrust bearing formed by a molding, wherein the thrust bearing rotatably supports the rotor shaft and has a structure to receive a load generated when the turntable is inserted over the rotor shaft.

5. A motor according to claim 4, wherein the rotor shaft is pressure-inserted in the first internal peripheral surface of the shaft insertion section formed in the turntable by a light-pressure insertion.

6. A motor according to claim 1, wherein the rotator is a turntable on which a disc is mounted, and the rotor shaft has a core adjusting ring that is moveably mounted on the rotor shaft, a spring that pushes up the core adjusting ring from the turntable, and a stopper that regulates ascending position of the core adjusting ring.

7. A motor according to claim 2, wherein the rotator is a rotor case with a rotor magnet mounted thereon.

8. A motor according to claim 7, wherein a lid member is pressure-inserted over the rotor shaft on an opposite side of the first internal peripheral surface with the second internal peripheral surface being interposed therebetween to thereby bring the lid member in close contact with the rotor case to close the gap.

9. A motor comprising:
   a rotor shaft;
   a rotator that rotates together with the rotor shaft;
   a shaft insertion section in a central area of the rotator, the shaft insertion section having a first internal peripheral surface of a first diameter that is smaller than an external diameter of the rotor shaft and a second internal peripheral surface having a second diameter greater than the external diameter of the rotor such that a gap is created between the second internal peripheral surface and the rotor shaft, wherein the first internal peripheral surface of the rotator engages the rotor shaft under a pressure; and
   an adhesive filled in the gap between the second internal peripheral surface and the rotor shaft to connect the rotator to the rotor shaft,
   wherein the adhesive is not present between the rotor shaft and the first internal peripheral surface of the shaft insertion section.

10. A motor according to claim 9, wherein a lid member is pressure-inserted over the rotor shaft on an opposite side of the first internal peripheral surface with the second internal peripheral surface being interposed therebetween to thereby close the gap by the lid member.

11. A motor according to claim 10, wherein the rotator is a turntable having a top surface and a bottom surface, the insertion section includes a protruded section downwardly extending in the axial direction from the bottom surface of the turntable in a central area of the turntable, and the turntable has a recessed section in the top surface for receiving the lid member in the central area of the turntable, the recessed section being continuous with the second internal peripheral surface.

12. A motor according to claim 11, further comprising a thrust bearing formed by a molding, wherein the thrust bearing rotatably supports the rotor shaft and has a structure to receive a load generated when the turntable is inserted over the rotor shaft.

13. A motor according to claim 12, wherein the rotor shaft is pressure-inserted in the first internal peripheral surface of the shaft insertion section formed in the turntable by a light-pressure insertion.

14. A motor according to claim 9, wherein the rotator is a turntable on which a disc is mounted, and the rotor shaft has a core adjusting ring that is moveably mounted on the rotor shaft, a spring that pushes up the core adjusting ring from the turntable, and a stopper that regulates ascending position of the core adjusting ring.

15. A motor according to claim 10, wherein the rotator is a rotor case with a rotor magnet mounted thereon.

16. A motor according to claim 15, wherein a lid member is pressure-inserted over the rotor shaft on an opposite side of the first internal peripheral surface with the second internal peripheral surface being interposed therebetween to thereby bring the lid member in close contact with the rotor case to close the gap.

17. A motor comprising:
   a rotor shaft;
   a rotator that rotates together with the rotor shaft;
   a shaft insertion section in a central area of the rotator, the shaft insertion section having a first internal peripheral surface of a first diameter that is smaller than an external diameter of the rotor shaft and a second internal peripheral surface having a second diameter greater than the external diameter of the rotor such that a gap is created between the second internal peripheral surface and the rotor shaft, wherein the first internal peripheral surface of the rotator engages the rotor shaft under a pressure; and
   an adhesive disposed in the gap between the second internal peripheral surface and the rotor shaft to connect the rotator to the rotor shaft;
   wherein a lid member is pressure-inserted over the rotor shaft on an opposite side of the first internal peripheral surface with the second internal peripheral surface lying between the first internal peripheral surface and the lid member so that the lid member thereby covers the gap between the rotor shaft and the second internal peripheral surface; and
   wherein the lid member is disposed on the rotor shaft on a side of the rotator opposite a core adjusting ring.

18. A motor according to claim 17, wherein the rotator is a turntable having a top surface and a bottom surface, the insertion section includes a protruded section downwardly extending in the axial direction from the bottom surface of the turntable in a central area of the turntable, and the turntable has a recessed section in the top surface for receiving the lid member in the central area of the turntable, the recessed section being continuous with the second internal peripheral surface.

19. A motor according to claim 18, further comprising a thrust bearing formed by a molding, wherein the thrust bearing rotatably supports the rotor shaft and has a structure to receive a load generated when the turntable is inserted over the rotor shaft.

20. A motor according to claim 18, wherein the rotor shaft is pressure-inserted in the first internal peripheral surface of the shaft insertion section formed in the turntable by a light-pressure insertion.

21. A motor according to claim 17, wherein the rotator is a turntable on which a disc is mounted, and the rotor shaft has a core adjusting ring that is moveably mounted on the rotor shaft, a spring that pushes up the core adjusting ring from the turntable, and a stopper that regulates ascending position of the core adjusting ring.

22. A motor according to claim 10, wherein the rotator is a rotor case with a rotor magnet mounted thereon.

* * * * *